United States Patent
Kakihara et al.

(10) Patent No.: US 8,190,815 B2
(45) Date of Patent: May 29, 2012

(54) STORAGE SUBSYSTEM AND STORAGE SYSTEM INCLUDING STORAGE SUBSYSTEM

(75) Inventors: Shinobu Kakihara, Odawara (JP); Mitsuhide Sato, Ooiso (JP)

(73) Assignee: Hitachi, Ltd., Tokyo (JP)

( * ) Notice: Subject to any disclaimer, the term of this patent is extended or adjusted under 35 U.S.C. 154(b) by 760 days.

(21) Appl. No.: 12/252,908

(22) Filed: Oct. 16, 2008

(65) Prior Publication Data
US 2010/0049902 A1 Feb. 25, 2010

(30) Foreign Application Priority Data
Aug. 21, 2008 (JP) ................... 2008-213372

(51) Int. Cl.
*G06F 12/00* (2006.01)
*G06F 13/00* (2006.01)
*G06F 13/28* (2006.01)
(52) U.S. Cl. ............. 711/113; 711/103; 711/E12.008; 711/E12.019
(58) Field of Classification Search .......... 711/103, 711/113, E12.008, E12.019
See application file for complete search history.

(56) References Cited

U.S. PATENT DOCUMENTS

| | | | | |
|---|---|---|---|---|
| 5,860,083 | A | * | 1/1999 | Sukegawa ............. 711/103 |
| 6,438,652 | B1 | * | 8/2002 | Jordan et al. ........... 711/120 |
| 2005/0138296 | A1 | * | 6/2005 | Coulson et al. ......... 711/141 |
| 2007/0050571 | A1 | * | 3/2007 | Nakamura et al. ...... 711/154 |
| 2007/0168608 | A1 | * | 7/2007 | Yoshida et al. ......... 711/113 |
| 2007/0288692 | A1 | * | 12/2007 | Bruce et al. ............ 711/113 |
| 2008/0086585 | A1 | * | 4/2008 | Fukuda et al. .......... 711/100 |
| 2008/0126668 | A1 |   | 5/2008 | Okuno et al. |
| 2008/0162795 | A1 | * | 7/2008 | Hsieh et al. ............ 711/103 |
| 2010/0205362 | A1 | * | 8/2010 | Lasser ................... 711/103 |

FOREIGN PATENT DOCUMENTS
JP 2008-134776 6/2008
* cited by examiner

*Primary Examiner* — Sheng-Jen Tsai
(74) *Attorney, Agent, or Firm* — Brundidge & Stanger, P.C.

(57) ABSTRACT

To provide a storage subsystem in which, even when plural types of storage devices are provided, write processing from a cache memory to the plural types of storage devices is not delayed. Even when there are relative merits in writing performance of write data from the cache memory to the HDD and the SSD, the cache memories 13A, 13B with respect to the SSD having low writing performance are provided independently of the cache memories 12A, 12B with respect to the HDD.

15 Claims, 16 Drawing Sheets

FIG. 2

| LU # | STORAGE MEDIA | MEDIA CAPACITY | ADDRESS RANGE | USED STATE OF CACHE IN SSD | APPLICATIONS |
|---|---|---|---|---|---|
| 0 | HDD | 500 GB | 0x00000000-0x0fffffff | – | |
| 1 | SSD | 64 GB | 0x10000000-0x1fffffff | NOT USED | |
| 2 | SSD | 64 GB | 0x20000000-0x2fffffff | NOT USED | |
| 3 | HDD | 500 GB | 0x30000000-0x3fffffff | – | |
| 4 | HDD | 500 GB | 0x40000000-0x4fffffff | – | |

FIG. 12

|  | UNIT | LOAD (USED) AMOUNT | CAPACITY |
|---|---|---|---|
| CTL0 | HOST | 60% | — |
|  | MP | 20% | — |
|  | BACK END | 50% | — |
|  | SHARED CM | 60% | 16 GB |
|  | SSD WRITE CM | 80% | 1 GB |
| CTL1 | HOST | 40% | — |
|  | MP | 40% | — |
|  | BACK END | 80% | — |
|  | SHARED CM | 40% | 16 GB |
|  | SSD WRITE CM | 50% | 1 GB |

FIG. 16

| HOST # | CTL | PORT # | ACCESS DESTINATION LU | STORAGE MEDIA | TIME | COMMAND | ADDRESS (HEAD ADDRESS) | BLOCK | TYPE DETERMINATION |
|---|---|---|---|---|---|---|---|---|---|
| A | 0 | A0 | 1 | SSD | 13:52:10 | R | 0 | 10 | SEQUENTIAL |
| A | 0 | A0 | 1 | SSD | 13:52:11 | R | 10 | 10 | SEQUENTIAL |
| A | 0 | A0 | 1 | SSD | 13:52:12 | R | 20 | 10 | SEQUENTIAL |
| A | 0 | A0 | 1 | SSD | 13:52:13 | R | 30 | 10 | SEQUENTIAL |
| A | 0 | A1 | 2 | SSD | 13:52:14 | W | 500 | 5 | RANDOM |
| A | 0 | A1 | 3 | HDD | 13:52:15 | R | 200 | 1 | RANDOM |
| A | 0 | A1 | 4 | HDD | 13:52:16 | R | 600 | 1 | RANDOM |
| A | 0 | A0 | 1 | SSD | 13:52:17 | R | 100 | 1 | RANDOM |
| A | 0 | A0 | 1 | SSD | 13:52:18 | R | 200 | 1 | RANDOM |
| B | 1 | B0 | 4 | HDD | 13:52:19 | R | 0 | 10 | SEQUENTIAL |
| B | 1 | B0 | 4 | HDD | 13:52:20 | R | 10 | 10 | SEQUENTIAL |
| B | 1 | B0 | 4 | HDD | 13:52:21 | R | 20 | 10 | SEQUENTIAL |
| B | 1 | B0 | 4 | HDD | 13:52:22 | R | 30 | 10 | SEQUENTIAL |

STORAGE SUBSYSTEM AND STORAGE SYSTEM INCLUDING STORAGE SUBSYSTEM

CROSS REFERENCES TO RELATED APPLICATIONS

This application relates to and claims priority from Japanese Patent Application No. 2008-213372, filed on Aug. 21, 2008, the entire disclosure of which is incorporated herein by reference.

BACKGROUND OF THE INVENTION

1. Field of the Invention

The invention relates to a storage subsystem on which plural different types of storage devices such as a hard disc drive and a flash memory as storage resources are mounted. The invention further relates to a storage system including a storage subsystem, an upper system and a storage device.

2. Description of the Related Art

The storage subsystem is known as a control system for storing data of the upper system such as a host in storage devices.

The storage subsystem includes a first interface control unit controlling data transmission and reception with respect to the upper system, a second interface control unit controlling data transmission and reception with respect to plural storage devices and a controller controlling data traffic between the host and storage devices.

A hard disk drive (HDD) has been used as the storage device in related arts, however, semiconductor memories such as a flash memory are coming into use as a storage resource for the storage subsystem because a manufacturing unit price of the flash memory is reduced. There exists a storage system on which both the HDD and a flash memory drive (SSD) are mounted as storage devices. There is a related art disclosed in JP-A-2008-134776 as the one concerning the present invention.

Patent Document: JP-A-2008-134776

SUMMARY OF THE INVENTION

A storage subsystem includes a cache memory into which data to be written in storage devices and data to be read from storage devices are temporarily stored.

Since performance of writing data is low in an SSD, there is a problem that write processing is delayed when the controller of the storage subsystem writes data from the cache memory to the SSD and the performance of writing data from the cache memory to the HDD is lowered.

Accordingly, an object of the invention is to provide a storage subsystem in which, even when plural types of storage devices are provided, write processing from the cache memory to the plural types of storage devices is not delayed.

Another object of the invention is to provide a storage subsystem including not only the HDD but also the SSD in which lowering of writing performance from the cache memory to the SSD is prevented so as not to affect the performance of write processing from the cache memory to the HDD.

In order to achieve the above objects, a storage system according to the invention is provided with a temporary storage area with respect to a type of storage device having low writing performance independently of a temporary storage area with respect to another type of storage device even when there are relative merits in the performances of plural types of storage devices in writing data from the cache memory.

According to the invention, a storage subsystem in which write processing from a cache memory to plural types of storage devices is not delayed even when plural types of storage devices are provided.

BRIEF DESCRIPTION OF THE DRAWINGS

FIG. 2 is a management table for determining a storage medium (HDD or SSD) as a write destination;

FIG. 12 is a management table managing amounts of load of various hardware resources in the storage subsystem;

FIG. 16 is a management table showing access histories from the host computer to the storage subsystem.

DESCRIPTION OF THE PREFERRED EMBODIMENTS

Figure 1:
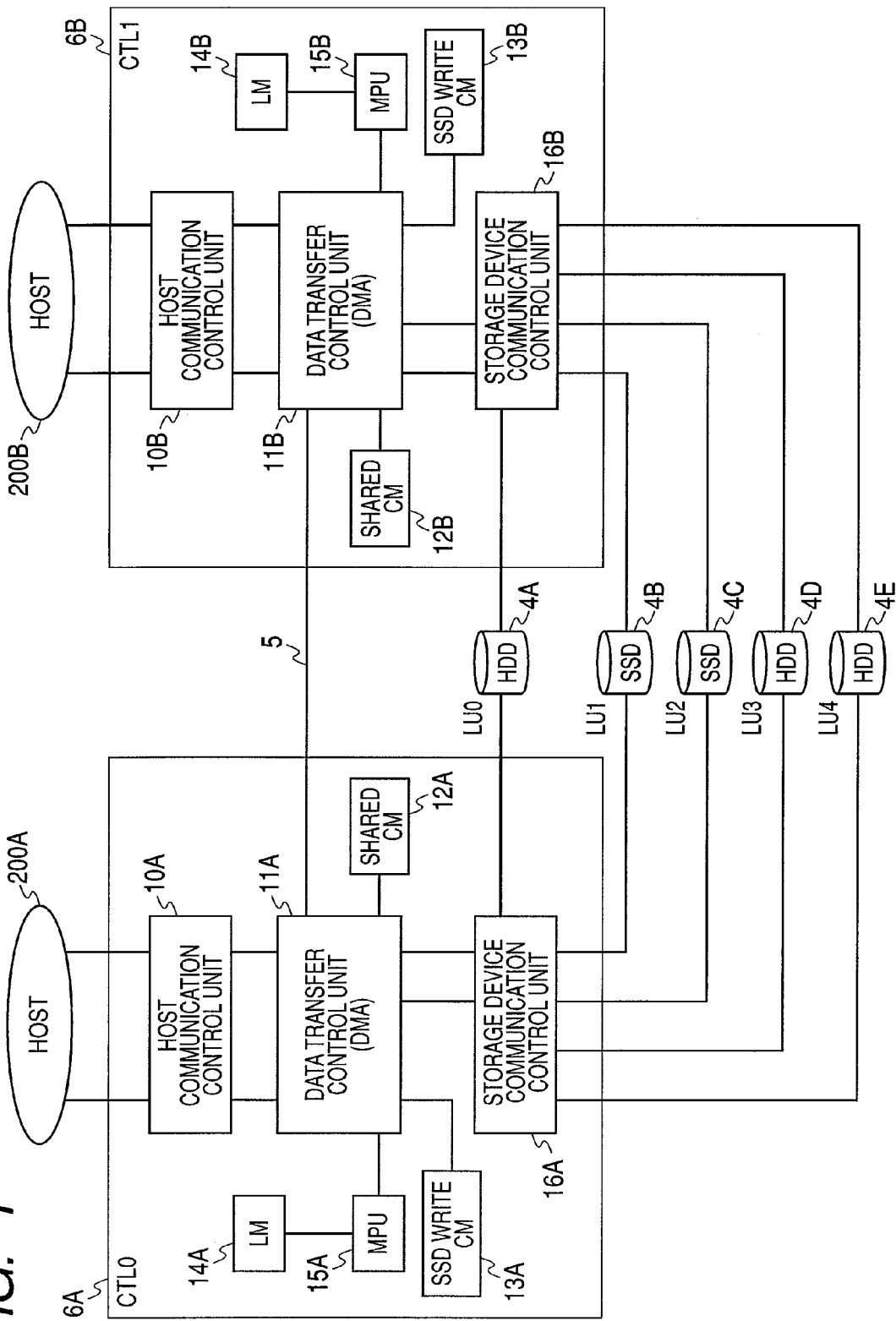
FIG. 1 is a storage control system (storage system) including a storage subsystem according to the invention.

Next, a storage control system (storage system) including a storage subsystem according to the invention will be explained with reference to FIG. 1. The storage system is configured by host computers 200A, 200B being connected to plural storage devices 4A to 4E through a storage control apparatus including a storage subsystem 6A and a storage subsystem 6B. The host computer 200A is connected to the storage subsystem 6A while the host computer 200B is connected to the storage subsystem 6B.

Each of the host computers 200A, 200B is a computer including information processing resources such as a CPU (Central Processing Unit) and a memory, specifically, formed by a personal computer, work station or mainframe or the like.

A communication port (for example, ports provided at a LAN card or a host bus adaptor) for accessing each of the storage subsystems 6A, 6B is provided at each of the host computers 200A, 200B respectively, and data input and output request commands can be transmitted to the storage subsystem through the communication port.

The storage subsystem 6A and the storage subsystem 6B can transmit and receive data or commands to and from each other through a connection bus 5. As the connection bus 5 between controllers, a bus complied with PCI (Peripheral Component Interconnect)-Express standard which realizes high-speed serial data communication is applied, in which a data transfer amount per a lane of one direction (8 lanes at maximum) is 2.5 (Gbit/sec). All the transmission and reception of data and respective information between the storage subsystems 6A, 6B which will be described later is performed through the connection bus 5.

The respective storage systems 6A, 6B control reading and writing of data with respect to the storage devices 4A to 4E in accordance with requests from the host computers 200A, 200B connected to themselves, including host communication control units 10A, 10B, data transfer control units 11A, 11B, shared cache memories (CM) 12a, 12B, SSD write cache memories (CM) 13A, 13B, local memories 14A, 14B, microprocessors (MPU) 15A, 15B, and storage device communication control units 16A, 16B. The host communication control units 10A, 10B are interfaces performing communication control with the host computers 200A, 200B.

The host communication units 10A, 10B include ports for directly connecting the storage subsystems 6A, 6B to a network or the host computers 200A, 200B. To each of the plural ports, a unique network address such as an IP (Internet Protocol) address or a WWN (World Wide Name) is assigned. The host communication units 10A, 10B include host communication protocol chips for performing protocol control at the time of communication with respect to the host computers 200A, 200B.

As a host communication protocol chip, when the communication protocol with respect to the host computers 200A, 200B is a fibre channel (FC) protocol, a fibre channel conversion protocol chip is applied, and when the communication protocol is an iSCSI protocol, an iSCSI protocol chip is applied. Namely, a protocol chip adapted to the communication protocol with respect to the host computers 200A, 200B is applied.

The host communication protocol chip further includes a multi-micro processor function which can achieve communication with plural microprocessors, and thereby performing communication with both the microprocessor 15A of the storage system 6A and the microprocessor 15B of the storage subsystem 6B.

The data transfer control units (DMA) 11A, 11B include a function of controlling data transfer between the storage subsystem 6A and the storage subsystem 6B and data transfer between respective hardware resources in the storage subsystems 6A, 6B. The data transfer control units (DMA) 11A, 11B temporarily store write data given by the host computers 200A, 200B in the shared CMs (cache memories) 12A, 12B or the SSD write CMs 13A, 13B in accordance with instructions from the microprocessors 15A, 15B belonging to the storage systems to which the data transfer control units 11A, 11B belong.

The data transfer control units 11A, 11B perform necessary data transfer so that the shared information stored in local memories 14A, 14B to be described later becomes the same, that is, when shared information of one local memory is updated, shared information of the other local memory will be updated in the same manner.

The microprocessors 15A, 15B include a function of controlling the whole operation of the storage subsystems 6A, 6B to which the respective microprocessors belong. The microprocessors 15A, 15B perform writing or reading processing of data with respect to logical volumes previously allocated to themselves in accordance with write commands or read commands stored in the local memories 14A, 14B as described later.

The allocation of the logical volumes to the respective microprocessors 15A, 15B can be dynamically changed according to the amount of load of the respective microprocessors 15A, 15B or reception of an associated microprocessor designation command designating an associated microprocessor per each logical volume given by the host computers 200A, 200B.

The allocation of the logical volumes to the respective microprocessors 15A, 15B can be dynamically changed also according to the presence or absence of failure occurrence in connection buses between the storage subsystems 6A, 6B and the host computers 200A, 200B, the connection bus 5 between the storage subsystem 6A and the storage subsystem 6B, the connection buses between the storage subsystems 6A, 6B and the storage devices 4A to 4D, and the like.

The local memories 14A, 14B are used for storing various control programs or for temporarily storing various commands such as a read command or a write command given by the host computers 200A, 200B. The microprocessors 15A, 15B process the read commands and the write commands stored in the local memories 14A, 14B in the order of storage in the local memories 14A, 14B.

The shared CMs 12A, 12B and the SSD write CMs 13A, 13B temporarily store data transferred between the host computers 200A, 200B and the storage devices 4A to 4E or the storage subsystems 6A, 6B.

The storage device communication control units 16A, 16B are interfaces for controlling the communication with respective storage devices 4A to 4E, and include storage device communication protocol chips. As the storage device communication protocol chips, for example, when an FC hard disk drive is applied as a storage device, an FC protocol chip can be applied, and when a SAS hard disk drive is applied, a SAS protocol chip can be applied, and further, when a SSD (flash memory drive) is applied as a storage device, a SSD protocol chip is applied.

The storage device communication control unit is connected to storage devices through switches on the storage devices. The storage device switch is a switch for switching plural storage devices with respect to the storage device communication control unit, and for example, a SAS-Expander or a FC loop switch can be applied. It is also possible to apply a configuration of connecting to the storage devices 4A to 4E by a FC loop, for example, instead of the storage device switch.

The storage devices 4A, 4D, 4E are hard disk drives, specifically, FC hard disk drives, SAS hard disk drives or SATA hard disk drives and the storage devices 4B, 4C are SSDs. In each storage device, storage elements (hard disks or flash memories) are arranged in an array. Plural logical volumes which are logical storage areas for reading and writing data are set with respect to the storage areas provided by these plural storage devices. The plural storage devices are integrated for realizing RAID.

The storage subsystems 6A, 6B provide logical units to the host computers 200A, 200B, and the host computers recognize the logical units to realize reading or writing of data with respect to the logical volumes.

In respective memory spaces of the storage subsystems 6A and 6B, mapping is performed at not only the memory space included in one storage subsystem but also at the memory space included in the other storage subsystem, and accordingly, one storage subsystem can directly access the memory space of the other storage subsystem.

When each of microprocessors 15A, 15B in each of the storage subsystems 6A, 6B receives a write command or a read command directed to a logical unit allocated to the other storage subsystem 6B or 6A from the host computers 200A, 200B, the microprocessor writes the write command or the read command to the local memory 14B or 14A in the other storage subsystem to transfer the command to the other storage subsystem 6B, 6A.

As described above, when a write command or a read command to be executed by the other storage subsystem 6B or 6A is given to the storage subsystem 6A or 6B from the host computers 200A, 200B, the write command or the read command is relayed to be directly written in the other local memory 14B or 14A so that it is not necessary to perform communication between the storage subsystems 6A and 6B for delivery the write command or the read command, which realizes rapid write command processing or read command processing.

Among write data from the host computers 200A, 200B to the storage subsystems 6A, 6B, data to be recorded in the SSDs 4B, 4C is temporarily stored in the SSD write CMs 13A, 13B by the data transfer control units 11A, 11B under control of the MPUs 15A, 15B.

On the other hand, among write data from the host computers 200A, 200B to the storage subsystems 6A, 6B, data to be recorded in the HDDs 4A, 4D and 4E is temporarily stored in the shared CMs 12A, 12B by the data transfer control units 11A, 11B.

The storage device communication control units 16A, 16B perform destage processing of data from the SSD write CMs and the shared CMs to a target storage device, not being synchronized with the timing at which the write command is issued by the host computer.

Additionally, the data transfer control units 11A, 11B which received a read command from the host computers 200A, 200B transfer the read command to the storage device communication control units 16A, 16B, and the storage device communication control units 16A, 16B acquire data from the storage device and transfer the read data to the shared CMs regardless whether the acquisition source of data is the SSD or the HDD.

The reason that the areas in which the data to be written in the SSD is temporarily stored are separated from the areas in which the data to be written into or read from the HDD is temporally stored is as follows.

To assure the host computers of consistency of data, an administrator of the storage subsystem uses the SSD as the storage device while disabling a cache in the SSD. Then, for writing data in SSD it is necessary for the microprocessor of the storage subsystem to write the data in the cache memory in the SSD after causing the SSD to perform erase processing of data in a sector unit. The write processing requires time, and meanwhile, overhead occurs in which writing of data from the cache memory to the HDD is delayed. Accordingly, the present inventors provide the SSD write CM independently of the shared CM by separating the bus from the shared CM so as to prevent adverse effects by the overhead.

The microprocessors 15A, 15B of the storage subsystems 6A, 6B determine whether write data is to be written in the SSD or written in the HDD based on, for example, a data storage destination of the write command.

FIG. 2 shows a management table for the above determination, which is stored in the local memories 14A, 14B. The MPUs 15A, 15B of the storage subsystems determine whether the write destination is the HDD or the SSD based on a write destination LU number (LU#) of a write command. The LU# of the management table is assigned to the host computer 200A or 200B.

The SSD write CMs (13A, 13B) and the shared CMs (12A, 12B) are configured by different integrated circuits, respectively. For example, a first cache memory is assigned to the shared CM and a second cache memory is assigned to the SSD write CM.

It is also possible that the first cache memory is assigned to the shared CM, a temporary storage area as a part of the second cache memory is assigned to the SSD write CM and the rest is assigned to the shared CM. In that case, when the storage area of the first cache memory has little room, data can be temporarily stored in the shared area of the second cache memory. The capacity of the area of the SSD write CM in the second cache memory may be dynamically changed.

The capacity of the SSD write CM may be set so as to correspond to the whole storage capacity of the SSD and the capacity of the SSD write CM may be set variable.

It is also possible that data to be destage-processed in the HDD is temporarily stored in the SSD write CM as the shared CM. This is performed when, for example, the temporal storage area of the SSD write CM has room.

Figure 3:
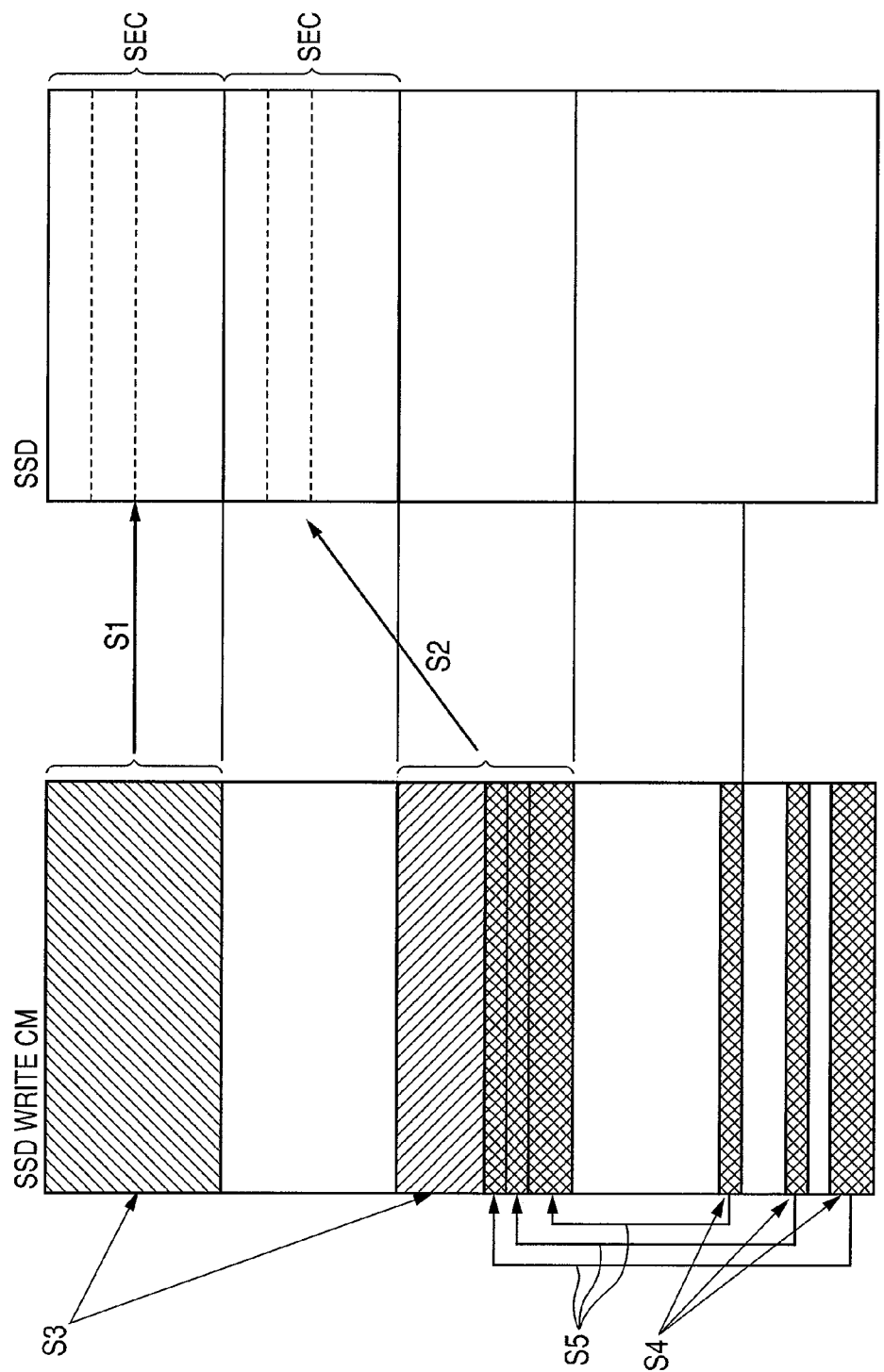
FIG. 3 is a block diagram for showing correspondence between storage areas of a SSD write CM and storage areas of a SSD.

FIG. 3 is a block diagram showing correspondence between storage areas of the SSD write CM and storage areas of the SSD. When the SSD performs write processing to a flash memory, the SSD needs to perform erase processing of the flash memory.

The erase processing is performed in a sector unit (SEC), therefore, data storage to the SSD write CM is performed in a sector unit (S3). After the erase processing of the flash memory is completed, data is transferred from the SSD write CM to the SSD (S1, S2). Since there is a limit in the number of times of writing in the flash memory, the SSD write CM saves write date from the host computer (this writing is performed in a page unit (S4)) in the same sector, and then write the data in the SSD afterward (S5).

Figure 4:
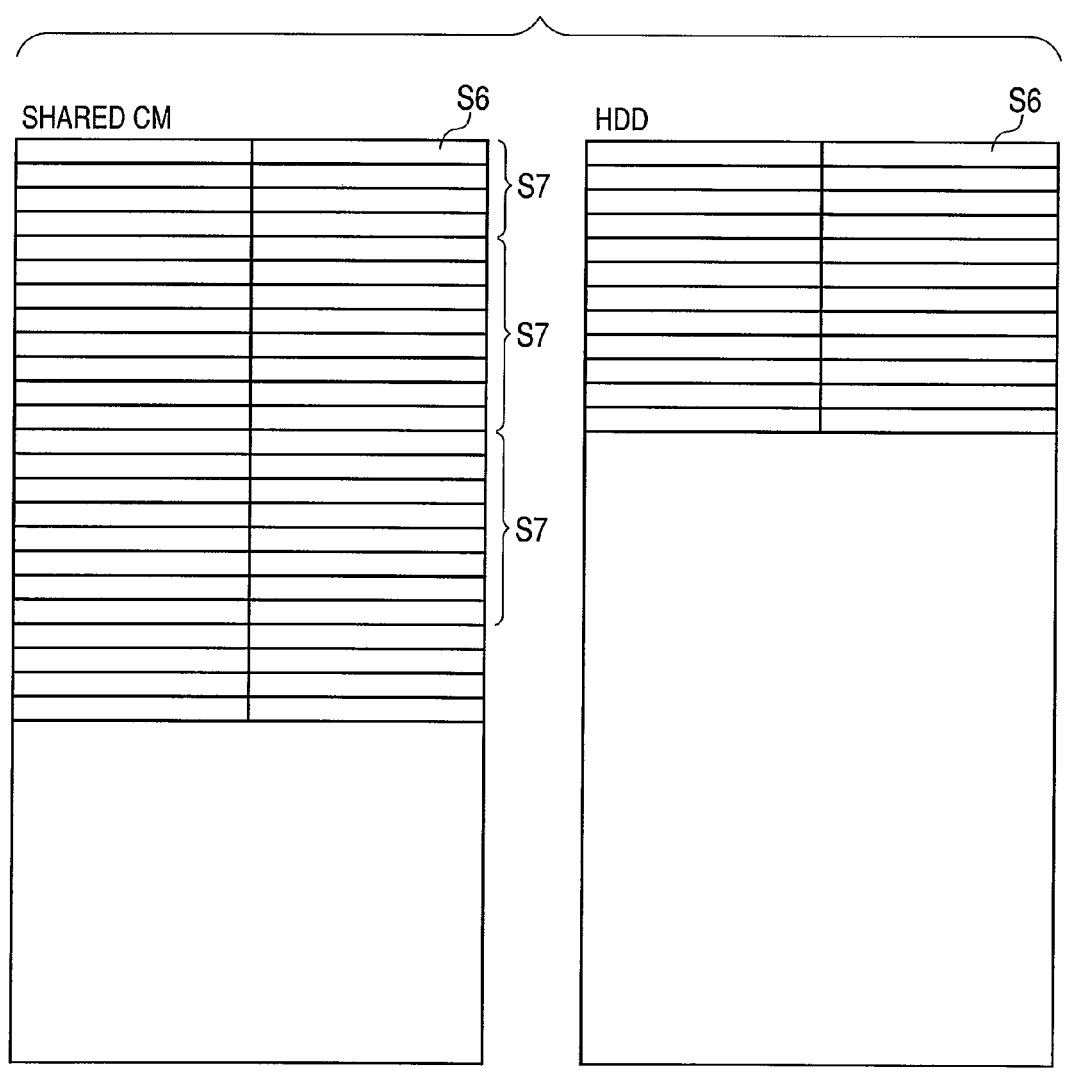
FIG. 4 is a block diagram showing correspondence between storage areas of a cache memory (shared CM) and storage areas of a HDD.

On the other hand, as shown in FIG. 4, writing of data from the cache memory (shared CM) to the hard disk drive is performed in a sector unit or in a segment unit S7 formed by plural sector units S6. It is not necessary for the HDD to perform erase processing when data in the cache memory is destaged to the HDD, which is different from the case in the SSD.

Figure 5:
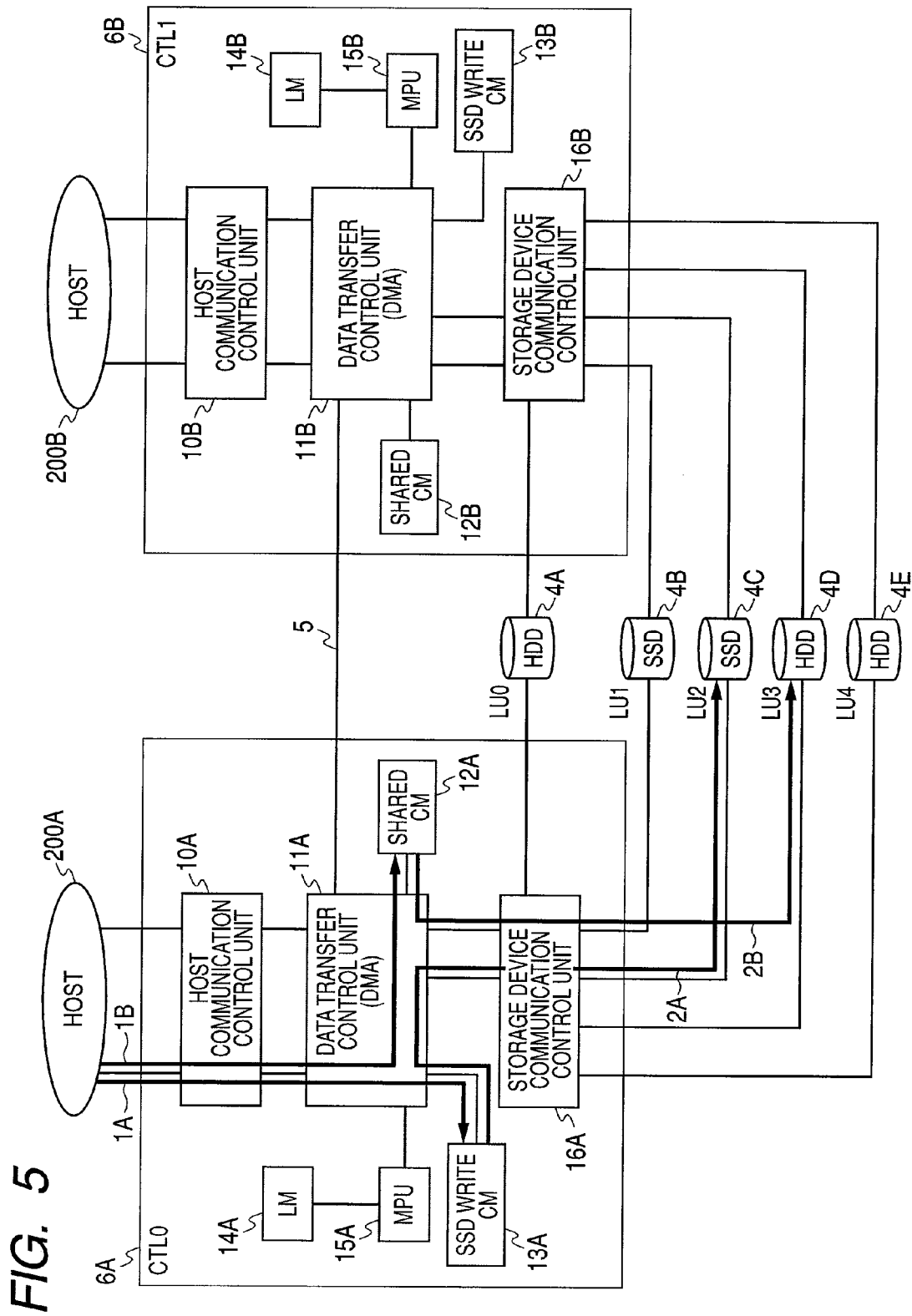
FIG. 5 is a block diagram explaining write operation in the storage system.

Next, write processing in the storage system shown in FIG. 1 will be described. FIG. 5 is a block diagram explaining write operation of the storage system and FIG. 6 is a flowchart explaining the write operation.

When a write command from the host computer 200A is received by the host communication control unit 10A of the storage subsystem 6A (600), the MPU 15A analyzes the write command through the DMA 11A (602), and checks an area of data storage destination (LU# of data write destination) by referring to the management table (FIG. 2) stored in the local memory 14A.

Figure 6:
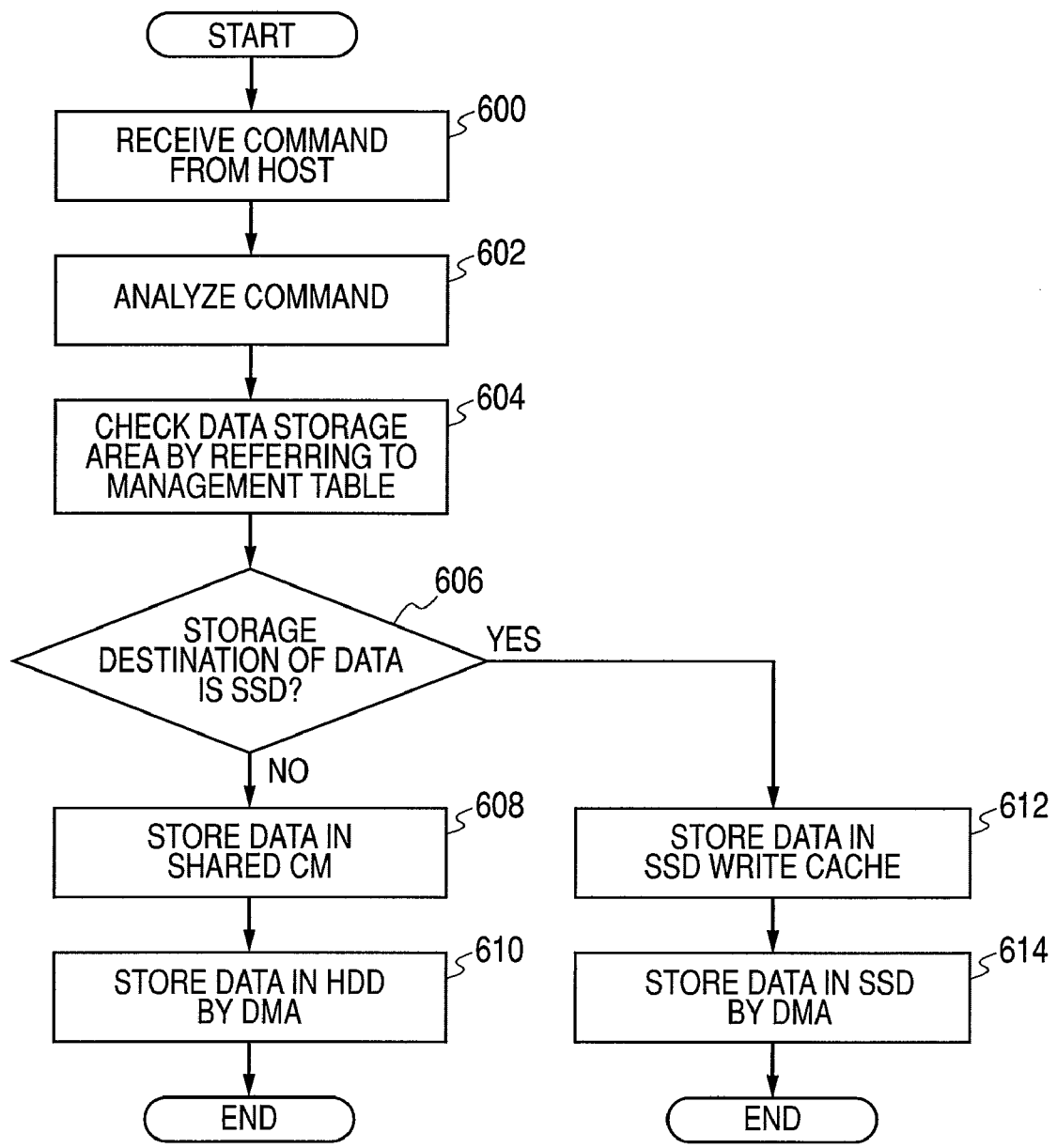
FIG. 6 is a flowchart explaining write operation shown in FIG. 6.

When the MPU 15A determines that the storage destination of the write data is an SSD (606), write data is temporarily stored in the SSD write CM 13A from the DMA 11A (1A in FIG. 5 and 612 in FIG. 6). Subsequently, the storage device communication control unit 16A acquires temporary storage data in the SSD write CM 13A through the DMA 11A, transmits the temporarily-stored write data to the SSD (4C) after the SSD completed erase processing, and then, the SSD stores the data in a flash memory (2A in FIG. 5 and 614 in FIG. 6).

On the other hand, when the MPU 15A determines that the storage destination of the write data is other than the SSD, that is, a HDD (606), and the write data is temporarily stored in the shared CM 12A through the DMA 11A (1B in FIG. 5 and 608 in FIG. 6). Subsequently, the storage device communication control unit 16A stores the write data stored in the shared CM 12A in the HDD 4D (2B in FIG. 5 and 610 in FIG. 6).

Figure 7:
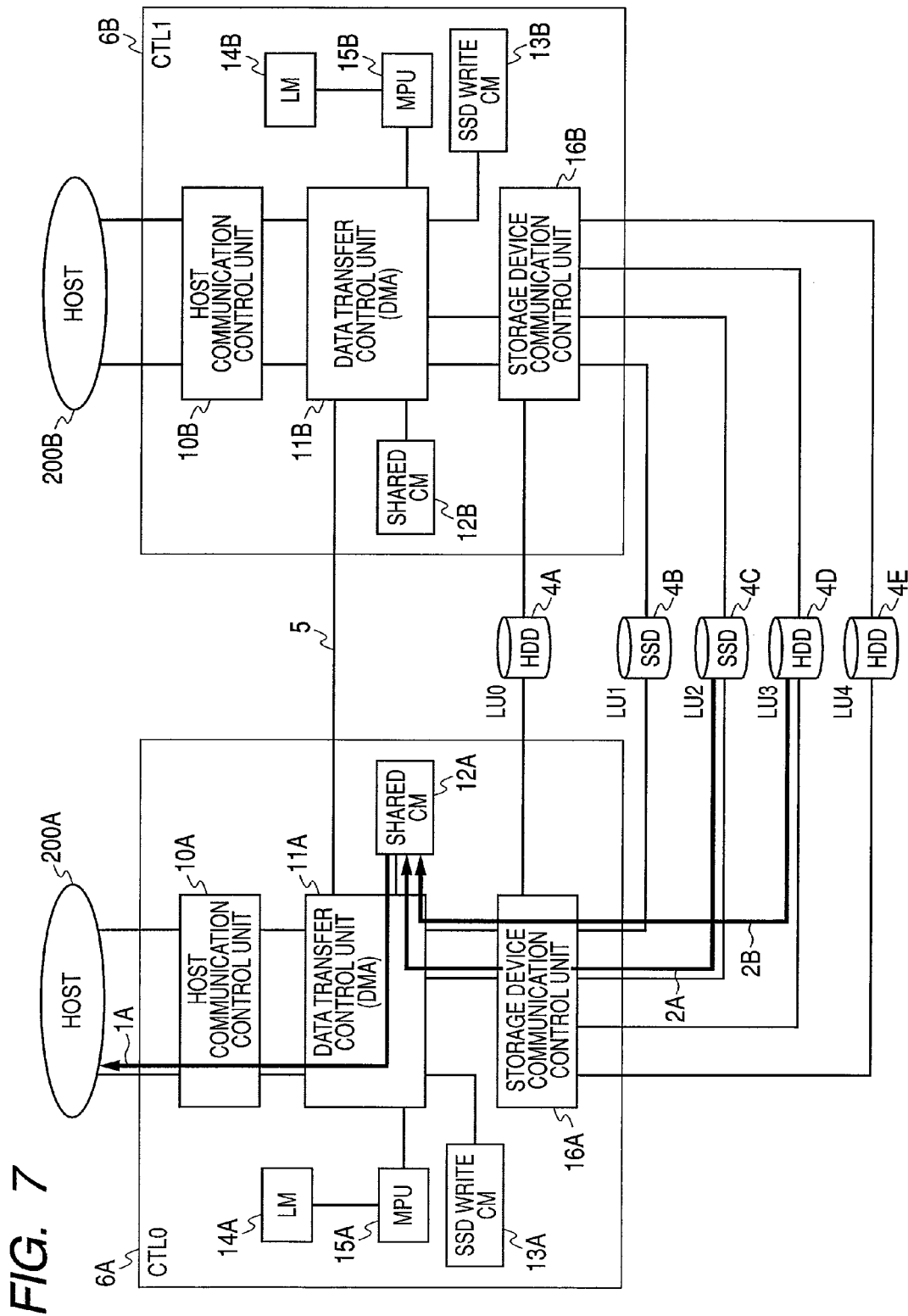
FIG. 7 is a block diagram explaining read operation of the storage system.
Figure 8:
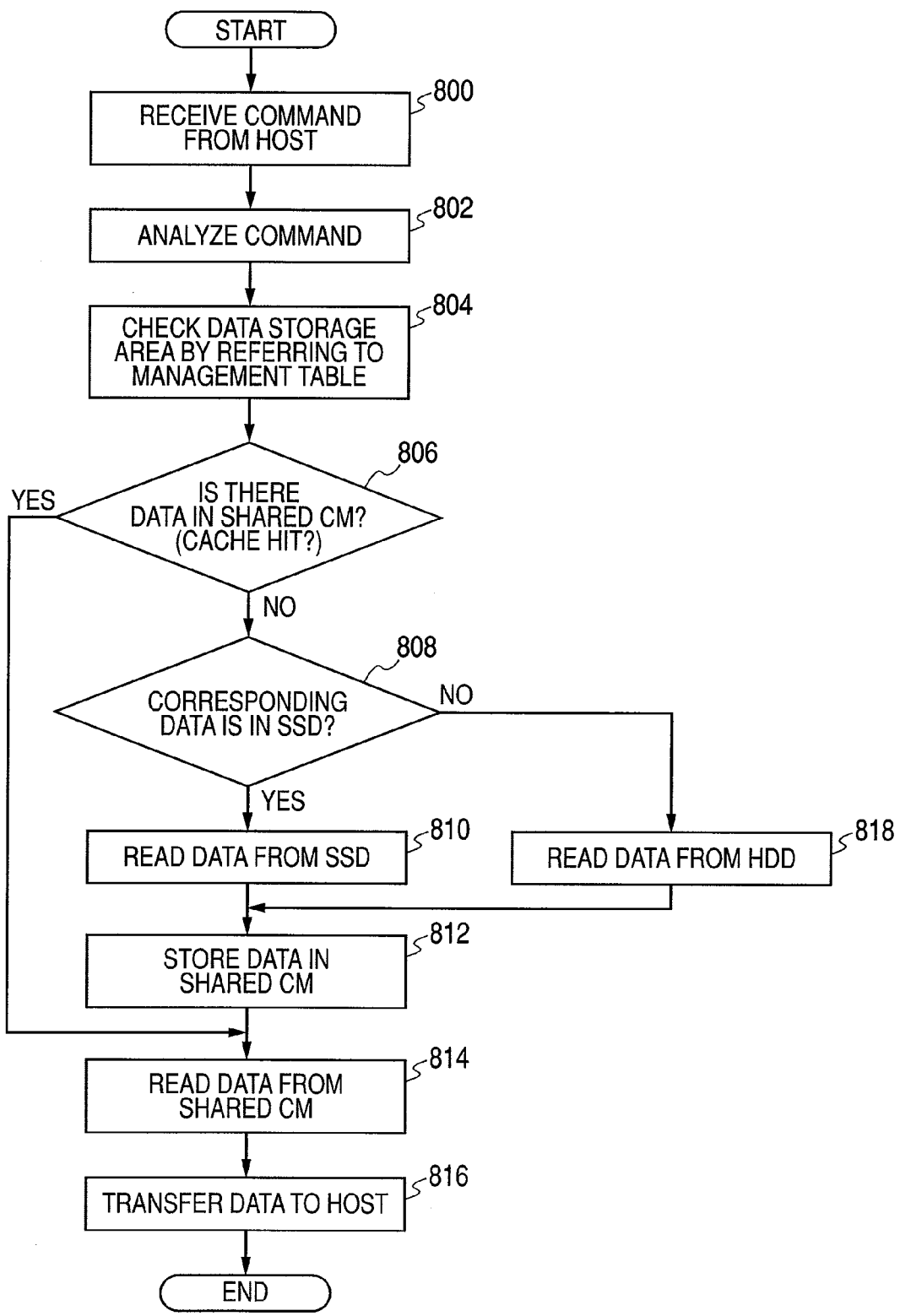
FIG. 8 is a flowchart explaining read operation.

Next, read operation will be explained. FIG. 7 is a block diagram for explaining read operation and FIG. 8 is a flowchart for explaining the read operation. The storage subsystem 6A analyzes a read command received from the host computer 200A and checks a storage destination of the read data by referring to the management table (800 to 804 in FIG. 8). Subsequently, the MPU 15A checks whether target data to be the target of the read command is present or not in the shared CM 12A (806), and when it is affirmative, the target data is read from the shared CM 12A through the DMA 11A as a cache hit (814) and transferred to the host computer 200A through the host communication control unit 10A (816).

When the MPU 15A checks that there is no data in the shared CM, the MPU 15A determines that it is a cache miss (806), and the storage device communication control unit 16A reads data from the SSD or the HDD which is a data storage destination (180, 818), and temporarily stores the read data in the shared CM 12A (812, 2A and 2B of FIG. 7). Subsequently, the MPU 15A instructs the DMA 11A to transfer the target data in the shared CM 12A to the host communication control unit 10A, and then, the host communication control unit 10A transfers the target data to the host computer 200A (816, 1A of FIG. 7).

The reason that the storage device communication control unit 16A transfers the read data to the shared CM 12A, not to the SSD write CM 13A is as follows. It is necessary to perform erase processing at the time of writing data in the SSD as described above. The write processing from the cache memory to the SSD is separated from the write processing from the cache memory to the HDD, and therefore, overhead with respect to the write processing to the HDD does not occur.

On the other hand, since it is not necessary to perform erase processing at the time of reading from the SSD, this kind of overhead does not occur, and accordingly, the SSD write CM is allocated for write processing to the SSD and read data is stored in the shared CM 12A. Incidentally, when the amount of load of the shared CM is high, for example, read data may be stored in the SSD write CM.

In the above-described write processing, the storage subsystem which received write data from the host computers stores the data in a storage device by using its own hardware resources such as the MPU. In the storage system of FIG. 1, as two storage subsystems are connected by the connection bus, when the amount of load of the hardware resources included in the storage subsystem which has received the write command from the host computer is high, it is possible that the other storage subsystem which has not received the write command processes the write command. This is referred to as "active-active processing", which means that the plural storage subsystems 6A, 6B shown in FIG. 1 are both made to be active to process the command. The operation of write processing and the operation of read processing under this processing will be explained in detail. On the assumption that a write command is issued from the host computer 200A to the storage subsystem 6A, the storage subsystem 6A will be referred to as "self-system" which has received the command and the other storage subsystem 6B will be referred to "another system" with respect to the "self-system".

Figure 9:
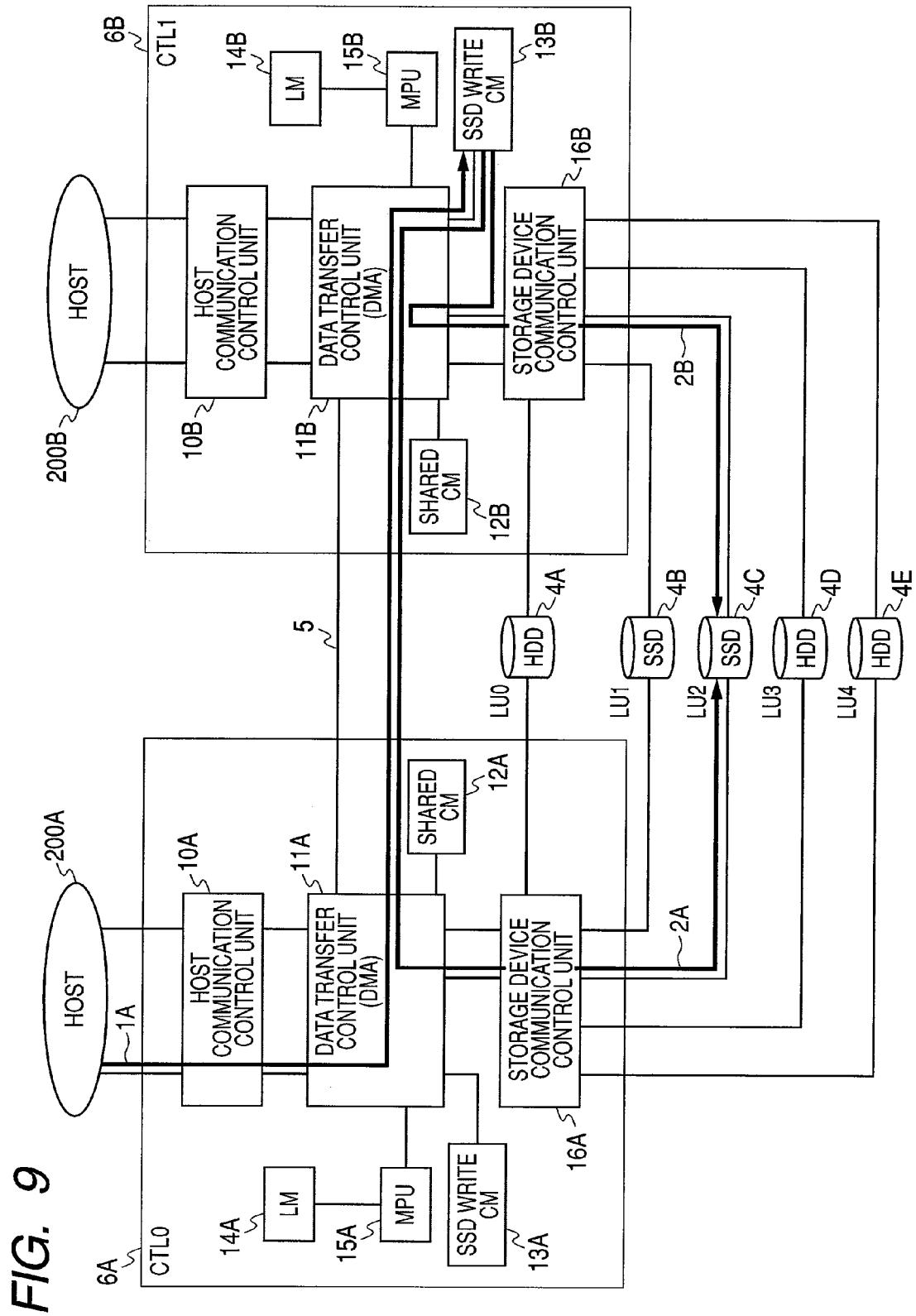
FIG. 9 is a first block diagram explaining write processing in active-active processing.
Figure 10:
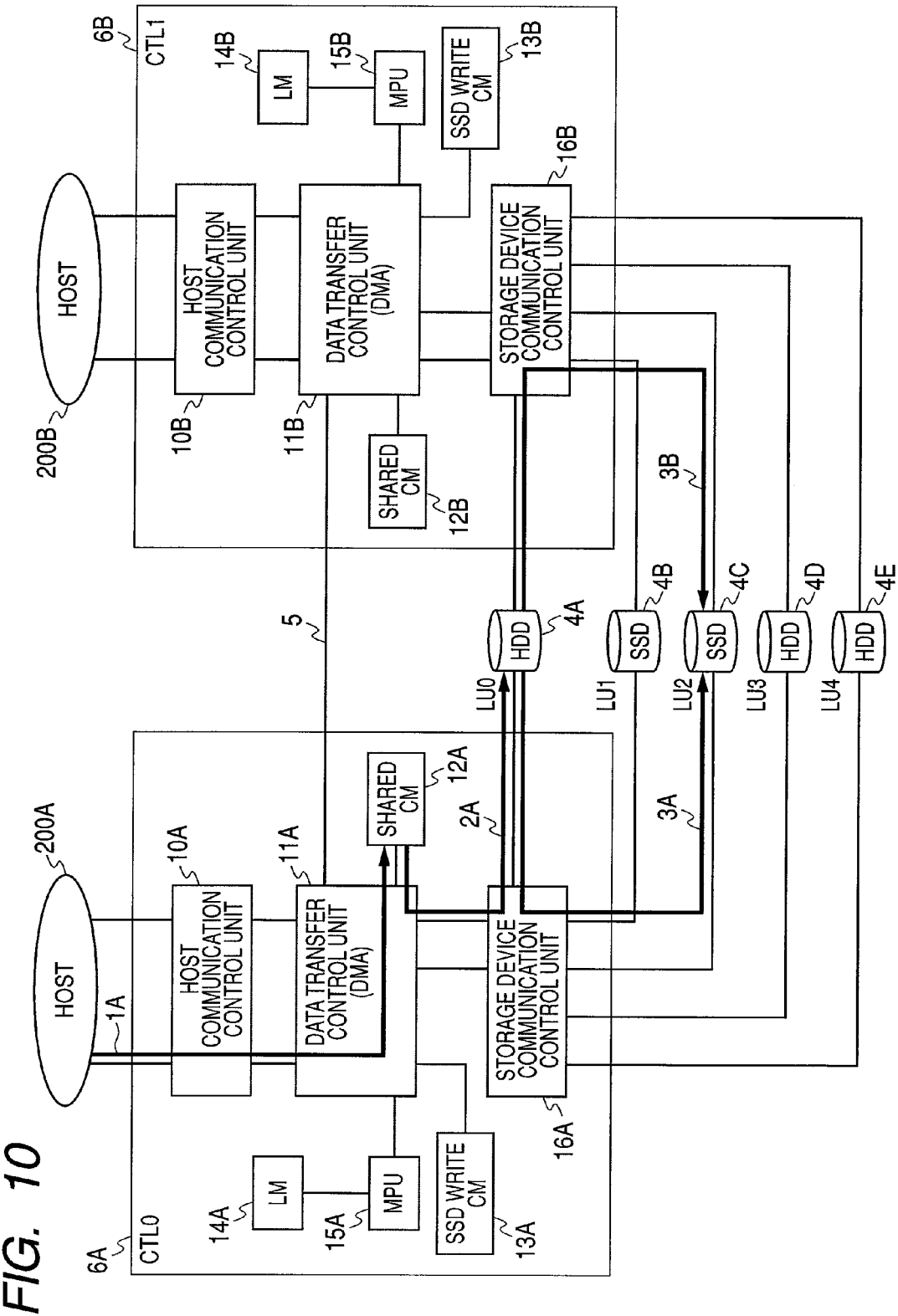
FIG. 10 is a second block diagram explaining write processing in active-active processing.
Figure 11:
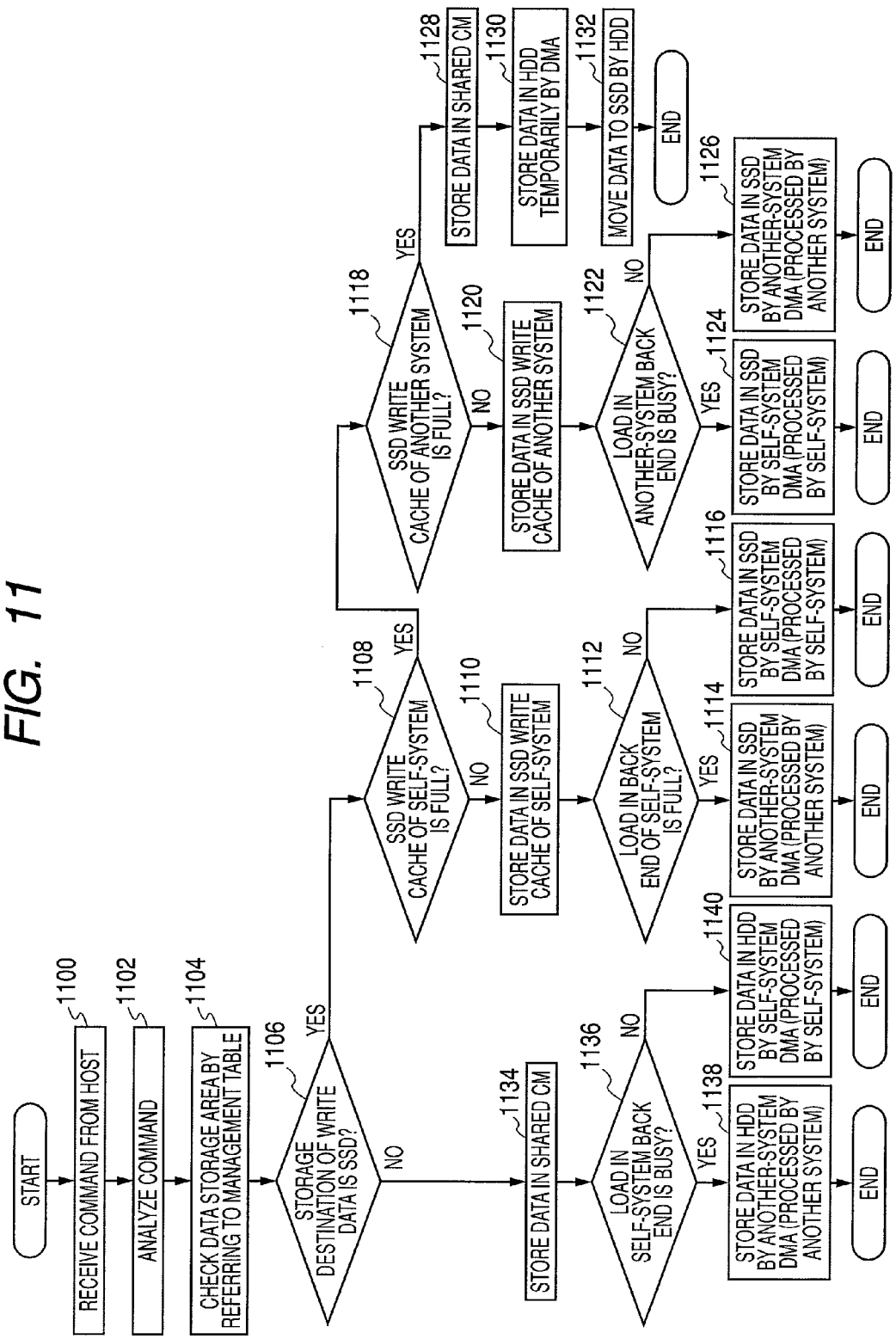
FIG. 11 is a flowchart explaining write processing.

First, write processing in the active-active processing will be explained. FIG. 9 and FIG. 10 are block diagrams explaining the write processing and FIG. 11 is a flowchart explaining the write processing. In the flowchart of FIG. 11, when the storage subsystem 6A as the self-system receives a write command from the host computer, the MPU 15 analyzes the command and checks a write destination of data (1100-1106).

When the write destination is the SSD (1106), the MPU 15A determines the amount of load in the SSD write CM 13A of the self-system (1108).

The amount of load in various hardware resources of the storage subsystem 6A as the self-system such as the SSD write CM 13A is managed as a management table as shown in FIG. 12. The management table is registered in the local memory 14B. The MPU 15A monitors the amount of load of the hardware resources of the self-system constantly or periodically, updating and registering the monitor results in the management table.

The amount of load in the hardware resources of the another system is monitored by the MPU 15B in the same manner, updated and registered in a management table in the local memory 14B. The MPUs 15A, 15B in the self-system and the another system exchange monitor information with each other, and not only the amount of load of the hardware resources of the self-system but also the amount of load of the hardware resources of the storage subsystem of the another system can be registered in both of the management tables. The both management tables are synchronized so as to correspond to each other.

The MPU 15A compares the amount of load of the SSD write CM 13A of the self-system, that is, a use state of the memory with a threshold by referring to the management table of the self-system (1108 in FIG. 11). When it is determined that the load does not exceed the threshold (the memory is not fully used), the MPU 15A temporarily stores write data in the SSD write CM 13A (1110).

Next, the MPU 15A checks the amount of load in a back end of the self-system, that is, the amount of load in the storage device communication control unit 16A by referring to the management table (1112), and when the MPU 15A determines that the amount of load in the back end of the self-system is busy as compared with the threshold, the MPU 15A allows the MPU 15B of the another system to have execution authorization of destage processing of the write data. Then, the MPU 15B of the another system acquires the data in the SSD write CM 13A of the self-system through the another system DMA 11B, the connection bus 5 and the self-system DMA 11A, allowing the storage device communication control unit 16B of the another system to store the data in the SSD 4B or 4C (1114). On the other hand, when the back end of the self-system is not busy, the self-system storage device communication control unit 16A writes the data of the SSD write CM 13A in the SSD (1116).

When the MPU 15A of the self-system determines that the amount of load in the SSD write CM of the self-system is "full", the MPU 15A checks the amount of load in the SSD write CM 13B of the another system by referring the management table in the local memory 14A, and when the amount of load thereof is not "full", the MPU 15B of the another system temporarily stores the write data in the SSD write CM 13B of the another system (1120, 1A of FIG. 9).

Subsequently, the self-system MPU 15A checks the amount of load in the storage device communication control unit 16B of the another system based on the management table in the local memory 14A (1112). When the back end of the another system is found to busy based on the checked amount of load, the MPU 15A transmits the write data from the write CM 13B of the another system to the storage device communication control unit 16A of the self-system through the DMA 11B, the connection bus 5 and the DMA 11A, allowing the storage device communication control unit 16A of the self-system to store the write data in the SSD (1124, 2A of FIG. 9).

On the other hand, in Step 1122, when the MPU 15A determines that the storage device communication control unit 16B of the another system is not busy, the MPU 15A notifies the determination result to the MPU 15B of the another system. The MPU 15B of the another system stores the data in the SSD write CM of the another system by using the storage device communication control unit 16B of the another system (1126, 2B of FIG. 9).

When the self-system MPU 15A determines that both the self-system SSD write CM 13A and the another-system SSD write CM 13B are full, the MPU 15A stores the write data in the self-system shared CM 12A temporarily, which is normally to be stored in the SSD write CM 13A (1128, 1A of FIG. 10). Subsequently, the self-system MPU 15A stores the data, which was temporarily stored in the shared CM 12A, in the HDD using the DMA 11A (1130, 2A of FIG. 10). At this time, the MPU 15A creates a correspondence table between an address of the write data in the HDD and an address of the write data in the SSD to which the data is to be stored, and register it in the local memory 14A. The MPU checks the correspondence table periodically, and when there exists an entry in the correspondence table, allowing the storage device communication control unit 16A or 16B to execute migration processing of a target write data from the HDD to the SSD (1132, 3A or 3B of FIG. 10). At this time, erase processing with respect to the SSD becomes necessary, and therefore, the MPU 16A performs the migration at the optimum timing, while checking the amount of load in the storage device communication control units 16A, 16B of the self-system and another system.

On the other hand, when the storage destination of the write data is the HDD, the self-system MPU 15A temporarily stores the write data in the self-system shared CM 12A (1134). Then, the MPU 15A checks the amount of load in the self-system and another-system back ends and stores the temporary storage data in the shared CM 12A in the target HDD by using the DMA and the storage device communication control unit which are not busy (1136-1140).

Figure 13:
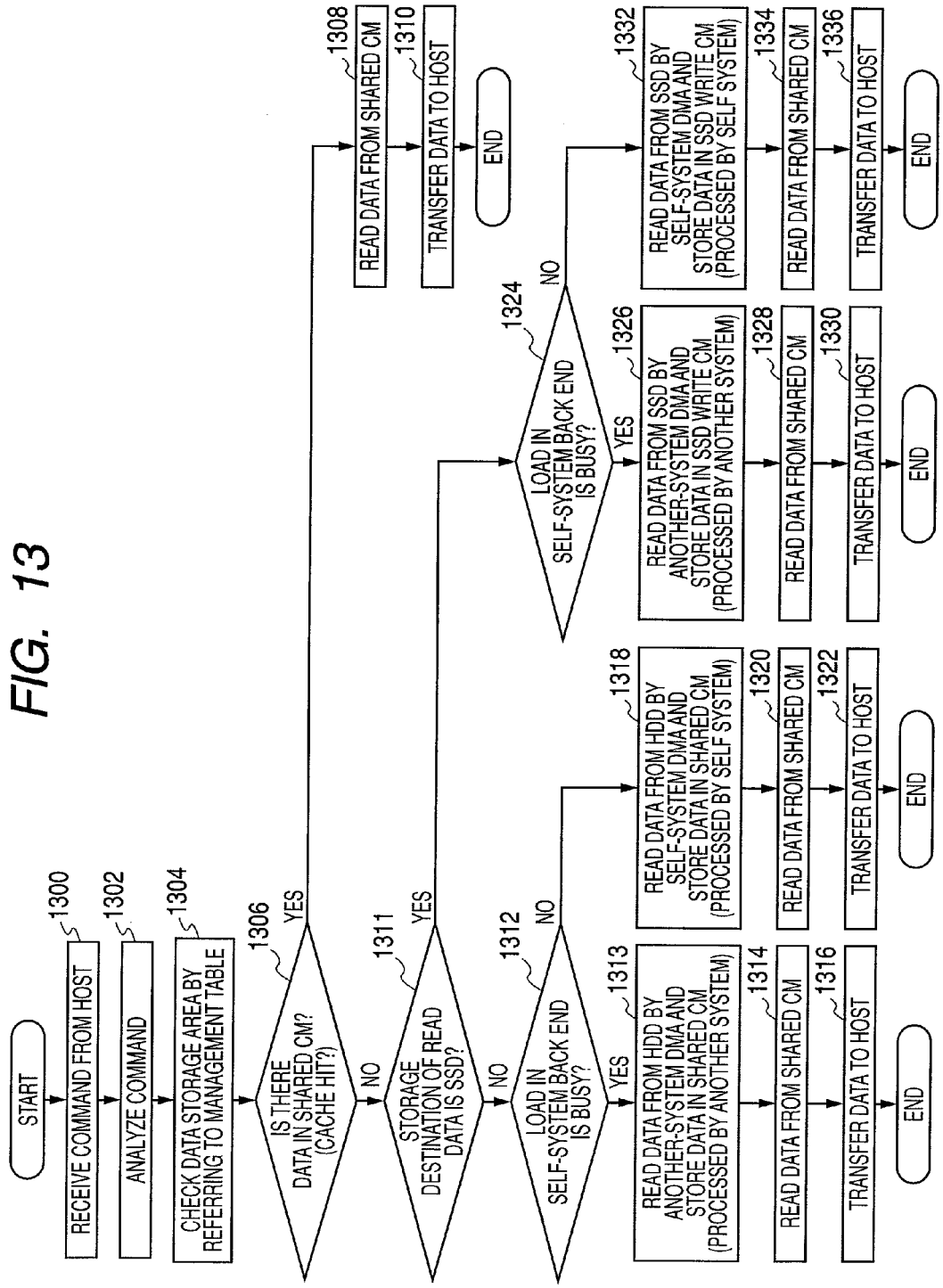
FIG. 13 is a flowchart showing read operation in active-active processing.
Figure 14:
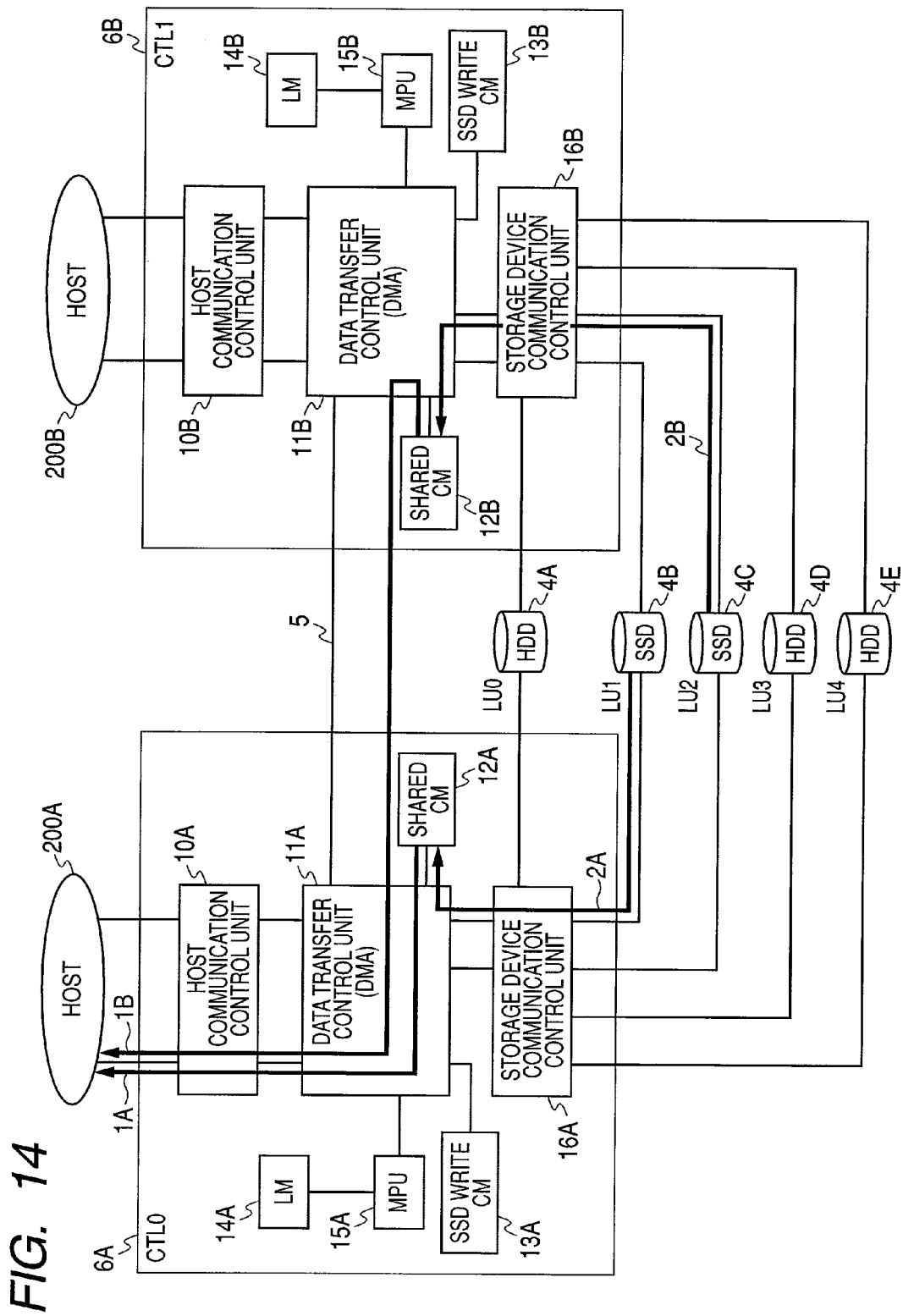
FIG. 14 is a first block diagram showing the read operation in FIG. 13.
Figure 15:
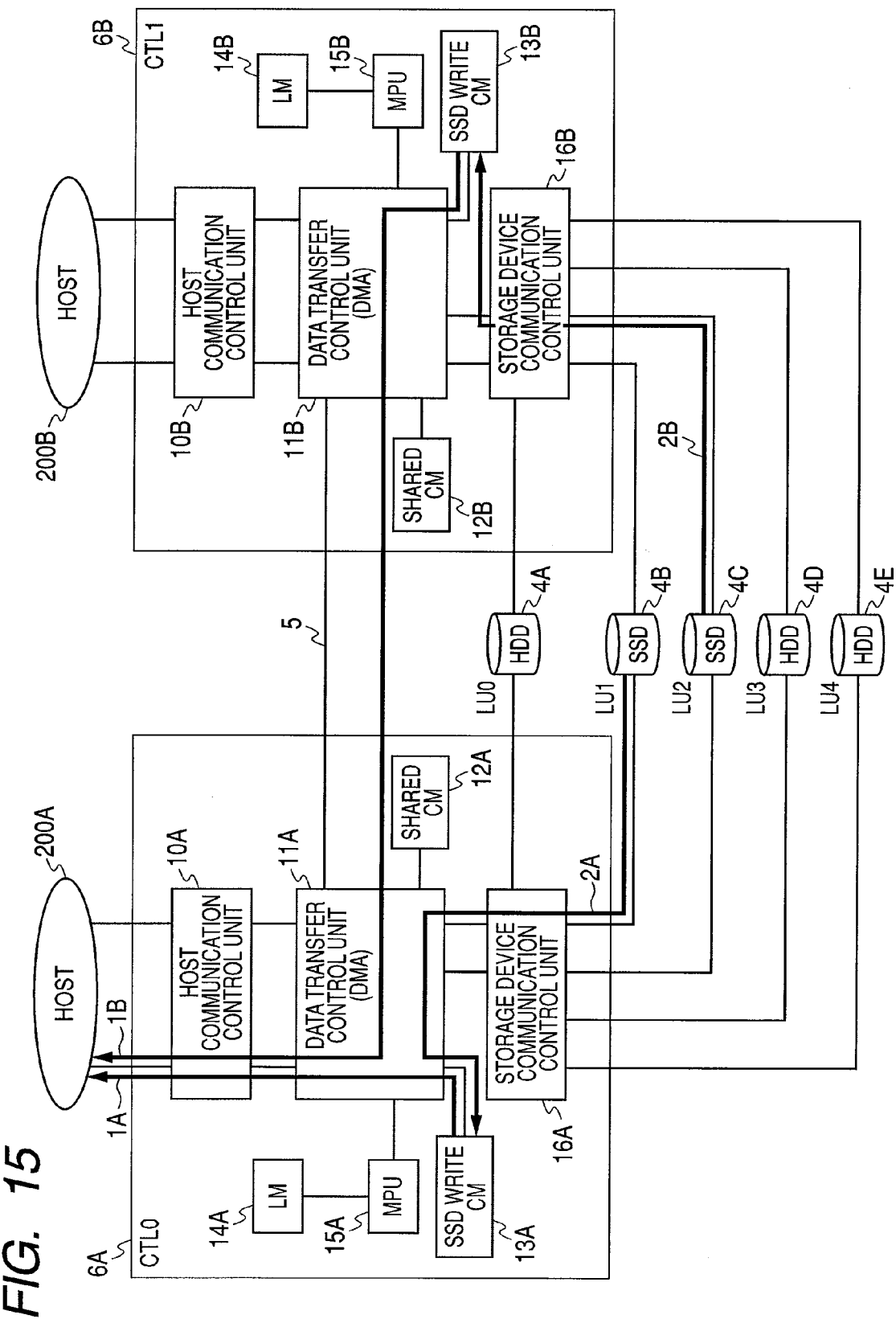
FIG. 15 is a second block diagram of the read operation.

Next, read operation in the active-active processing will be explained. FIG. 13 is a flowchart showing read operation, and FIG. 14 and FIG. 15 are block diagrams showing read operation. Steps 1300 to 1306 are the same as in the flowchart of the above-described read processing (800-806 in FIG. 8).

When the MPU 15A of the self-system determines that a target read data exists in the self-system shared CM 12A, the self-system DMA 11A reads the target read data (1308), transferring the data to the host 200A (1310).

On the other hand, when the MPU 15A determines that the target read data does not exist in the shared CM 12A (1306), the MPU 15 determines whether the read data exists in the SSD or HDD (1311). When it is determined that the read data does not exist in the SSD, the MPU 15A checks the amount of load in the self-system back end when reading the data from the HDD (1312).

When it is determined that the amount of load in the self-system back end is busy, the DMA 11B and the storage device communication control unit 16B of the another-system read the data from the HDD, and the another-system shared CM 12B (or the self-system shared CM 12A) temporarily stores the target data (1314). The another-system DMA 11B and the self-system DMA 11A transfer the temporarily stored data from the shared CM 12B to the host communication control unit 10A, then, to the host computer 200A of the self-system (1316).

When the MPU 15A determines that the amount of load in the another-system back end is busy, the self-system hardware resources such as the DMA 11A transfer the target data to the host computer 200A (1318-1322).

When the MPU 15A determines that the data, which is the target of the read command, exists in the SSD (1311), the self-system hardware resources or the another-system hardware resources read the target data from the SSD and store the data in the self-system shared CM 12A or the another-system shared CM 12B in accordance with the amount of load in the self-system back end (1324), and then transfers the read data to the host computer 200A (1326-1336). The state of data transfer is shown in 1A, 1B, 2A and 2B of FIG. 14.

FIG. 15 is a block diagram showing operations in which the storage subsystem of the self-system which has received the read command from the host computer transfers read data to the host computer by using the SSD write CM. When the amount of load in the self-system back end is low, the self-system storage device communication control unit 16A temporarily stores the read data from the SSD in the self-system SSD write CM 13A in accordance with the route 2A. The self-system DMA 11A transfers the read data from the self-system SSD write CM 13A to the self-system host communication control unit 10A.

On the other hand, when the amount of load of the another-system back end is low, the another-system storage device communication control unit 16B reads the data from the SSD and the another-system SSD write CM temporarily stores the data in accordance with the route 2B. Then, the another-system DMA 11B and the self-system DMA 11A transfer the read data from the another-system SSD write CM 13B to the host computer 200A through the self-system host communication control unit 10A in accordance with the route 1B.

Next, read operation and write operation of the storage system of FIG. 1 will be explained by focusing attention to the characteristics of data concerning a write or read command issued by the host computer to the storage subsystem 6A, namely, whether the data is sequential data or random data.

These kinds of data characteristics are recorded in an access history table shown in FIG. 16. The access history table includes log information from the host computers to the self-system and another-system storage subsystems. The access history table includes items of identification information of the host computer which issued a command (HOST#), identification information of the storage subsystem (CTL), a logical unit accessed from the host computer (LU), a type of storage media to which a write command or a read command is issued (SSD or HDD), accessed time, distinction between a write command and a read command (R or W), a read or write-access destination logical address (head address), block length of data, an access-type determination result (sequential or random).

The access history table is created by a management device not shown in FIG. 1, the self-system and another-system MPUs 15A, 15B, and registered in the self-system and another-system local memories 14A, 14B.

The self-system MPU 15A and the another-system MPU 15B may create the access history table by cooperating with each other, or the self-system MPU 15A may have an authorization of creating the access history table, for example, so that the access history table created by the self-system MPU 15A is periodically copied to the another-system local memory 14B.

The management device or the self-system and another-system MPUs 15A, 15B analyze a write command from the host computer to check the write address. When it is found that the write address is an address continued from the address of the last log by referring to the access history table, the write command is determined to be a sequential access, and when it is found that the write address is not a continuous address, the write command is determined to be a random access. The determination results are registered in the access history table.

In the write processing shown in FIG. 6 and FIG. 11, the self-system or another-system MPU 15A or 15B checks a write command and determines that the write command is a sequential access or a random access by referring to the history management table.

When the write command is a random access, data is stored in the storage areas in the cache memory (the shared CM or the SSD write CM) in a block unit at random. The shared CM and the SSD write CM arrange the randomly recorded data in a certain sector unit, and destage the data which was arranged in the sector unit into the HDD or the SSD. When the write command is a sequential access, the shared CM and the SSD write CM stores the data in a certain fixed sector areas sequentially.

Next, in the read processing shown in FIG. 8 and FIG. 13, the self-system or another-system MPU 15A or 15B checks a read command and determines whether the data to be read is sequential access data or random access data by referring to the history management table in FIG. 16. Particularly, in the case that the data to be read is a sequential access, data is read also from areas of extra parts other than the read target when reading the sequential data from the storage medium (HDD or SSD) of the read target, and the data is stored in the sequential areas in the shared CM. When the write command from the host computer accesses the extra read data, it will be a cache hit. When there exists in the HDD data read frequency of which is more than a certain number, the self-system or another-system storage device communication control unit performs migration of the data group from the HDD to the SSD. Accordingly, the storage device communication control unit can read data at a higher speed as compared with the HDD. It is preferable that data whose write access is frequent is moved from the SSD to the HDD.

In the above embodiment, the SSD is used as a storage device in a mode allowing the cache memory in the SSD to be OFF, however, in a mode allowing the cache memory in the SSD to be enable, write data to the SSD may be cached in the shared CM. When the cache memory in the SSD is allowed to be enable, write processing to the SSD can be performed at a high speed. For example, in the case that write data from the host computer is directed to the LU assigned to the SSD whose internal cache memory is enable, the write data is stored in the shared CM. In the case that write data is directed to the SSD whose internal cache memory is in the off-mode, the write data is stored in the SSD write CM temporarily. It is also preferable that the SSD whose internal cache memory is in the on-mode is assigned to temporary storage of data at the time of write/read processing to the HDD.

In the above embodiment, the storage subsystems 6A, 6B are provided with the shared CMs and the SSD write CMs respectively, however, even when one storage subsystem is provided with the SSD write CM, the other storage subsystem can use the SSD write CM of one storage subsystem by the active-active processing.

It is also possible that the cache memory in one storage subsystem is the shared CM and the cache memory in the other storage subsystem is the SSD write CM.

What is claimed is:

1. A storage system, comprising:
a first storage subsystem connecting to a first upper system;
a second storage subsystem connecting to a second upper system;
storage devices to which the first storage subsystem and the second storage subsystem are connected respectively; and
a connection bus which enables the exchange of data or commands by connecting the first storage subsystem to the second storage subsystem; and
wherein the storage devices include a first type of storage device and a second type of storage device,
wherein the first storage subsystem includes:
a first hard disk drive including a plurality of segments for storing data,
a first flash memory drive including a plurality of sectors for storing data, and a first controller including:
a first cache memory that is coupled to the first hard disk drive and the first flash memory drive and that temporarily stores write data to be written in the first hard disk drive, read data from the first hard disk drive and read data from the first flash memory drive,
a second cache memory that is coupled to the first flash memory drive and that temporarily stores write data to be written in the first flash memory drive without storing write data to the hard disk drive,
wherein the first controller transfers the write data in the second cache memory to a sector of the first flash memory drive in a sector unit,
wherein data in the sector of the first flash memory drive is erased before storing the write data transferred from the first controller, and
wherein the first controller transfers the write data in the first cache memory to a segment of the first hard disk drive without erasing data in the segment,
and
wherein the second storage subsystem includes:
a second hard disk drive including a plurality of segments for storing data,
a second flash memory drive including a plurality of sectors for storing data, and a second controller including:
a third cache memory that is coupled to the second hard disk drive and the second flash memory drive and that temporarily stores write data to be written in the second hard disk drive, read data from the second hard disk drive and read data from the second flash memory drive,
a fourth cache memory that is coupled to the second flash memory drive and that temporarily stores write data to be written in the second flash memory drive without storing write data to the hard disk drive,
wherein the second controller transfers the write data in the fourth cache memory to a sector of the second flash memory drive in a sector unit,
wherein data in the sector of the second flash memory drive is erased before storing the write data transferred from the second controller, and
wherein the second controller transfers the write data in the third cache memory to a segment of the second hard disk drive without erasing data in the segment.

2. The storage system according to claim 1, wherein the first type of storage device is a hard disk drive, and
wherein the second type of storage device is a flash memory drive.

3. The storage system according to claim 2, wherein when a load of the second cache memory in the first storage subsystem exceeds a predetermined amount, the second controller of the second storage subsystem temporarily stores data in the fourth cache memory, which is to be written in the flash memory drive.

4. The storage system according to claim 3, wherein when a load of the fourth cache memory of the second storage subsystem exceeds a predetermined amount, the first controller of the first storage subsystem temporarily stores data in the first cache memory, which is to be written in the flash memory drive.

5. The storage system according to claim 4, wherein the first controller stores the data which was temporarily stored in the first cache memory in the hard disk drive.

6. The storage system according to claim 5, wherein the first controller or the second controller performs migration of the data which was stored in the hard disk drive to the flash memory drive.

7. A storage system, comprising:
a first storage subsystem connecting to a first upper system;
a second storage subsystem connecting to a second upper system;
storage devices to which the first storage subsystem and the second storage subsystem are connected respectively; and
a connection bus which enables exchange of data or commands by connecting the first storage subsystem to the second storage subsystem;
wherein the storage devices includes a first type of storage device and a second type of storage device,
wherein the first storage subsystem includes:
a first hard disk drive including a plurality of segments for storing data,
a first flash memory drive including a plurality of sectors for storing data, and a first controller including:
a first cache memory that is coupled to the first hard disk drive and the first flash memory drive and that temporarily stores write data to be written in the first hard disk drive, read data from the first hard disk drive and read data from the first flash memory drive,
a second cache memory that is coupled to the first flash memory drive and that temporarily stores write data to be written in the first flash memory drive without storing write data to the hard disk drive,
wherein the first controller transfers the write data in the second cache memory to a sector of the first flash memory drive in a sector unit,
wherein data in the sector of the first flash memory drive is erased before storing the write data transferred from the first controller, and
wherein the first controller transfers the write data in the first cache memory to a segment of the first hard disk drive without erasing data in the segment, and
wherein the second storage subsystem includes:
a second hard disk drive including a plurality of segments for storing data,
a second flash memory drive including a plurality of sectors for storing data, and a second controller including:
a third cache memory that is coupled to the second hard disk drive and the second flash memory drive and that temporarily stores write data to be written in the second hard disk drive, read data from the second hard disk drive and read data from the second flash memory drive,
a fourth cache memory that is coupled to the second flash memory drive and that temporarily stores write data to be written in the second flash memory drive without storing write data to the hard disk drive,
wherein the second controller transfers the write data in the fourth cache memory to a sector of the second flash memory drive in a sector unit,
wherein data in the sector of the second flash memory drive is erased before storing the write data transferred from the second controller, and
wherein the second controller transfers the write data in the third cache memory to a segment of the second hard disk drive without erasing data in the segment,
wherein the first cache memory temporarily stores the write data to the first type of storage device, and
wherein the second cache memory temporarily stores the write data to the second type of storage device.

8. A storage subsystem comprising:
a hard disk drive including a plurality of segments for storing data,
a flash memory drive including a plurality of sectors for storing data, and a controller including:
a first cache memory that is coupled to the hard disk drive and the flash memory drive and that temporarily stores write data to be written in the hard disk drive, read data from the hard disk drive and read data from the flash memory drive,
a second cache memory that is coupled to the flash memory drive and that temporarily stores write data to be written in the flash memory drive without storing write data to the hard disk drive,
wherein the controller transfers the write data in the second cache memory to a sector of the flash memory drive in a sector unit,
wherein data in the sector of the flash memory drive is erased before storing the write data transferred from the controller, and
wherein the controller transfers the write data in the first cache memory to a segment of the hard disk drive without erasing data in the segment.

9. The storage subsystem according to claim 8, further comprising:
a first cache memory including the first temporary storage area; and
a second cache memory including the second temporary storage area.

10. The storage subsystem according to claim 9, wherein a bus from the first cache memory to the first type of storage device is separated from a bus from the second cache memory to the second type of storage device.

11. The storage subsystem according to claim 10, wherein the first type of storage device is a hard disk drive, and
wherein the second type of storage device is a flash memory drive.

12. The storage subsystem according to claim 11, wherein the first cache memory temporarily stores write data to the hard disk drive and the second cache memory temporarily stores write data to the flash memory drive.

13. The storage subsystem according to claim 9, wherein the controller temporarily stores the data read from the first type of storage device and the data read from the second type of storage device in the first cache memory.

14. The storage subsystem according to claim 8, wherein a logical unit which is an access destination of the upper system is set to be different according to the first type of storage device and the second type of storage device.

15. The storage subsystem according to claim 11, wherein an internal cache memory included in the flash memory drive is set to be disable.

* * * * *